No. 832,600. PATENTED OCT. 9, 1906.
H. DAHL.
SPEED INDICATOR.
APPLICATION FILED FEB. 14, 1902.
2 SHEETS—SHEET 1.
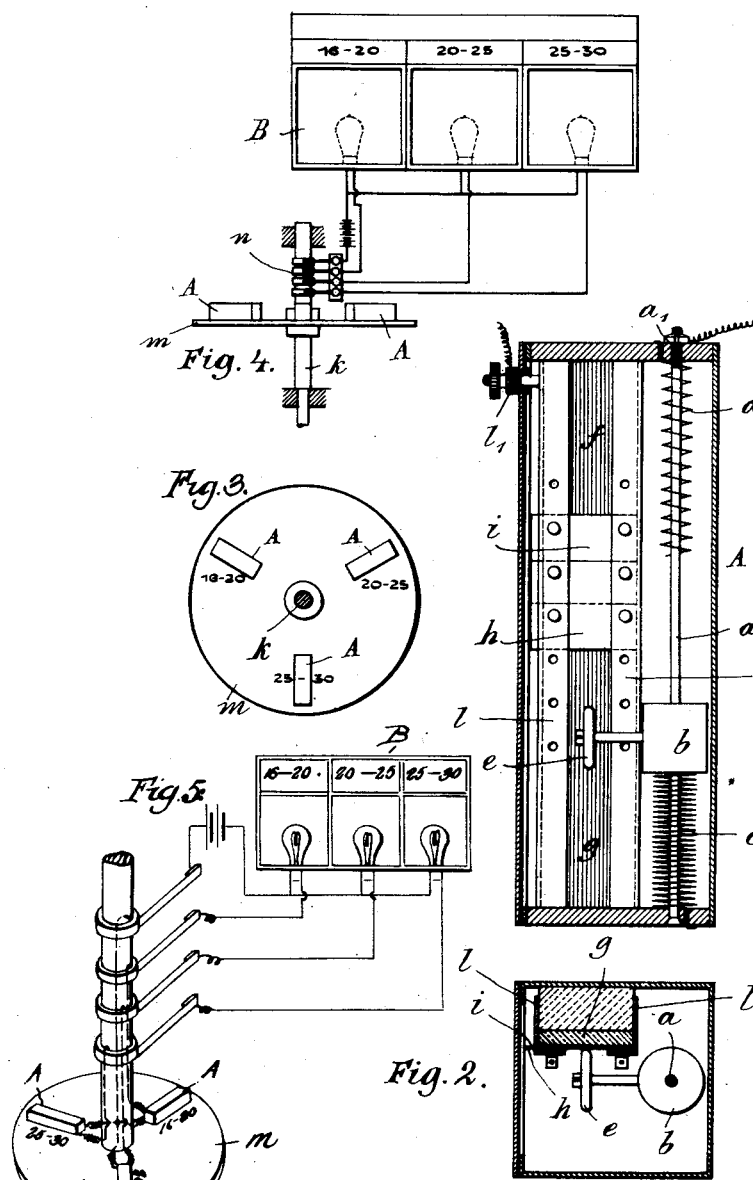

No. 832,600. PATENTED OCT. 9, 1906.
H. DAHL.
SPEED INDICATOR.
APPLICATION FILED FEB. 14, 1902.

Witnesses
Henry Hasper,

Inventor
Hans Dahl

UNITED STATES PATENT OFFICE.

HANS DAHL, OF BERLIN, GERMANY.

SPEED-INDICATOR.

No. 832,600.        Specification of Letters Patent.        Patented Oct. 9, 1906.

Application filed February 14, 1902. Serial No. 94,022.

*To all whom it may concern:*

Be it known that I, HANS DAHL, a subject of the King of Sweden and Norway, residing at Berlin, in the Kingdom of Prussia and German Empire, have invented new and useful Improvements in Speed-Indicators, of which the following is a specification.

Speed-indicators as hitherto constructed do not offer a means of permanently controlling the motion, as in general they only indicate maximum and minimum. If, however, they indicate a number of speeds, the individual indications are given more or less momentarily. In any case they are detached indications. Such more or less momentary detached indications are insufficient and offer no real control. The case will always arise that the speeds which come between two detached indications are unindicated and remain for hours unindicated. The interpolation of further detached speed indications affords no assistance, since even then the intermediate speeds remain unindicated. For example, if the detached indication is effected by colored-light signals there will appear at one time a red, at another time a yellow or a green or a blue light. This temporary display of differently-colored lights obviously offers no certain control of the motion.

In order to afford a permanent control, according to the present invention speeds lying between definite limits are indicated by a common signal, which is displayed so long as the speed remains between these two limits. Thus in the case, for instance, of electric signaling the closing of the circuit does not signify a detached speed limit, but a continuing contact—*i. e.*, a group of speeds.

I will now illustrate my meaning by means of a concrete example.

Tram-cars may travel in particular streets only at a speed below a certain limit—thus in one street under sixteen kilometers, in another under twenty kilometers, in a third under twenty-five kilometers, per hour. Control by means of detached signals at sixteen, twenty, and twenty-five kilometers per hour, whether by three bells or three lights of different colors, is practically useless, since between sixteen and twenty kilometers, as also between twenty and twenty-five kilometers, &c., the tram travels without any indication being given. Really effective control can only be attained by the employment of means which give a permanent indication of the rate of travel of the car, and preferably the continuing indications should be in conjunction, so as to act continuously one after the other. In this case both driver and persons in the street can determine at any moment whether the car is going at a permissible speed.

The invention is illustrated by the appended drawings, in which—

Figure 1 shows a section of an instrument according to this invention. Fig. 2 is a cross-section taken through Fig. 1. Fig. 3 is a plan view, drawn to a smaller scale, of a rotary disk fitted with three of the instruments shown in Figs. 1 and 2. Fig. 4 is a side elevation of Fig. 3, illustrating also means whereby electricity may be conducted from the disk-shaft. Fig. 5 is an elevation of a signal-board for employment in conjunction with the indicator contact device. Fig. 6 is a sectional view showing a modified construction of the apparatus illustrated by Fig. 1. Fig. 7 is a sectional view showing a modified construction of the apparatus illustrated by Fig. 1, in which stationary spring-contacts are employed.

As shown in Figs. 1 and 2, A is a closed casing containing a centrifugal body $b$, sliding on a round metal rod $a$ and retained by a spring $c$, while another spring $d$ acts as stop or brake to arrest its motion. $e$ is a transversely-located contact-roller running on a track $f g$, composed of a strip of glass or other suitable insulator, across which extend the adjustable metal plates $h$ $i$. These plates may be secured in any convenient manner. In the construction shown in Fig. 1 they are fastened in position by means of lateral metal angles $l$ $l$, provided with set-screws, whereby the length of the track $h$ $i$ can be altered, as circumstances require. Terminals $a'$ $l'$ are provided for the attachment of electric conductors to the rod $a$ and strips $l$, respectively.

Figs. 3 and 4 show three of the devices A arranged on a rotary disk $m$, mounted on a shaft $k$.

Fig. 4 shows a method by which the current may be conducted from the rotating shaft $k$ to the signal-board B, Fig. 5, a set of brushes or contact-springs $n$ being employed for the purpose.

Figures 6, 7:
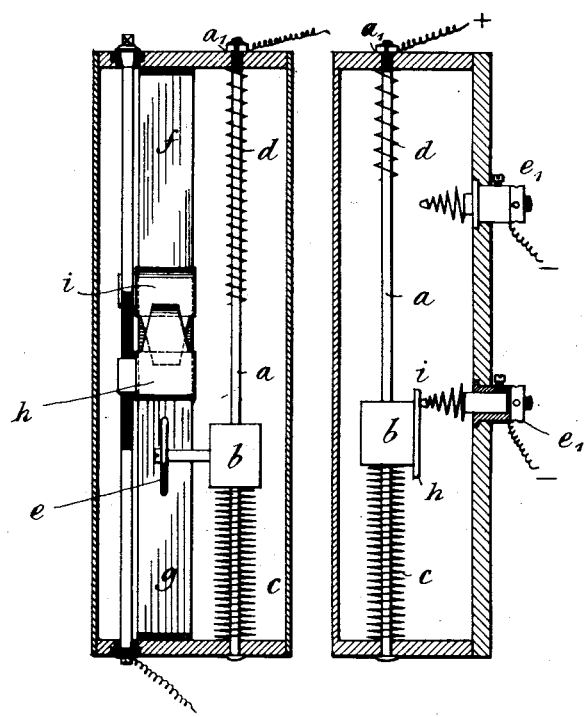

The three devices shown in Fig. 3 are constructed for three different speed groups—viz., sixteen to twenty, twenty to twenty-five, twenty-five to thirty. These groups are signaled, according to Fig. 5, by means of differently-colored electric lights—red, blue, and yellow—consisting of incandescent lamps located behind colored panes. As long as the tram-car runs at one speed lying between sixteen and twenty the signal-board B, Fig. 5, shows a permanently-red light, which, however, changes to blue immediately the speed exceeds twenty kilometers per hour and into yellow when the speed exceeds twenty-five kilometers per hour. The tram driver, therefore, is always instructed as to the speed at which he is traveling without any particular attention being necessary, since change of color can be remarked in an instant. The attention of the driver, therefore, is not unduly occupied, and he can continue to devote himself solely to proper driving of the tram, whereby also the service is rendered easier, while the safety of the public is increased.

Referring to the arrangement shown in Figs. 1 and 3, the contact-surfaces $h\ i$ on the track $f\ g$ of each of the three boxes A are so located relatively to one another that the roller $e$ of the second box (twenty to twenty-five) makes a contact immediately the roller $e$ of the first box (sixteen to twenty) has left its contact-track $h\ i$. For this reason the three control-springs $c$ in the three boxes are of different strengths.

Instead of completing the circuit in each of the three boxes A directly it is preferable to complete the circuit in two of the boxes simultaneously on the speed changing from one speed group to another. If, therefore, on the board, Fig. 5, red and blue lights are seen simultaneously, the conclusion to be drawn is that the speed at the moment is exactly twenty kilometers per hour.

The present invention is not only of value for tramway service, but is of the utmost importance for many purposes, since by its means speeds can be permanently controlled, such as hitherto has not been possible. It is also of value for motor-cars, locomotives, and even for steamships. In short, it may be applied to rotating machinery in general and, indeed, under certain circumstances also for other than rotary motions.

The construction of instrument shown in Fig. 6 is very similar to that illustrated in Fig. 1. The contact-pieces $h\ i$, however, are formed each with a projecting tongue, and these tongues lap over one another. The means for securing the contact-plates are here applied laterally instead of, as in Fig. 1, on the face of bars $l\ l$.

It will be obvious that instead of having the contact-surface separate from the centrifugal body $b$ the surface $h\ i$ might be arranged on the latter, as shown in Fig. 7, one or more stationary contact devices, such as a spring $e'$, being then provided, with which the centrifugal body contacts in its movements.

The precise manner of constructing and arranging the various parts may naturally be greatly varied from that illustrated without any departure from the essential features of the invention.

It will thus be seen that the horizontally-rotating body has mounted thereon contact means in the form of a plurality of broad contacts or contacts of duration, such as plates $h\ i$, arranged on different radii of the body. Coöperating with this contact means is a plurality of centrifugally-operated contact-bodies, each body remaining in electrical connection with the contact means until a succeeding contact has entered into connection with the contact means, thus causing each signaling device of the signaling-board to signal until another one of the devices signals.

Having thus described my invention, what I claim as new, and desire to secure by Letters Patent, is—

1. In a speed-indicator, the combination of contact means, and a plurality of centrifugally-operated contacts each arranged so that it remains in connection with the contact means until another centrifugally-operated contact has entered into connection with said contact means.

2. In a speed-indicator, the combination of a plurality of contacts, and a plurality of centrifugally-operated contacts each arranged so that it remains in connection with one of the first-named contacts until another centrifugally-operated contact has entered into connection with another of the first-named contacts.

3. In a speed-indicator, the combination of a plurality of contacts, and a plurality of centrifugally-operated contacts each arranged so that it is connected with one of the first-named contacts when the preceding centrifugally-operated contact has broken its connection with its contact.

4. In a speed-indicator, the combination of a plurality of broad contacts or contacts of duration, and a plurality of centrifugally-operated contacts each arranged so that it remains in connection with one of the first-named contacts until the succeeding centrifugally-operated contact has entered into connection with its contact.

5. In a speed-indicator, the combination with a rotary body, of a plurality of contacts arranged on different radii of the rotary body, a plurality of centrifugally-operated contacts each arranged so that it remains in connection with one of the first-named contacts until a succeeding centrifugally-operated contact has made connection with its contact.

6. In a speed-indicator, the combination with a rotary body, of contact means on the body, a plurality of centrifugally-operated contacts movable outwardly from the axis of the rotary body and each remaining in connection with the contact means until another enters into connection with said means.

7. In a speed-indicator, the combination with a horizontally-rotating body, of a plurality of contacts of duration disposed on different radii on said body, a plurality of spring-controlled bodies rotating with and moving outwardly by centrifugal force from the axis of the rotating body, each body remaining in connection with one of the radial contacts until another body enters into connection with another radial contact.

8. In a speed-indicator, the combination with a horizontally-rotating body, of a plurality of contacts of duration disposed on different radii on said body, a plurality of contact-bodies movable outwardly by centrifugal force from the axis of the rotating body, a plurality of springs of different strength, acting on the centrifugally-operated contact-bodies and each causing one of the centrifugally-operated bodies to remain in connection with one of the radial contacts until another centrifugally-operated body enters into connection with another radial contact.

9. In a speed-indicator, the combination with a plurality of signal devices, of a plurality of centrifugally-operated bodies each one controlling one of the signal devices and causing it to signal until another signal device is caused to signal by another centrifugally-operated body.

10. A speed-indicator comprising a plurality of electrically-operated signal devices, a rotary body, contact means thereon, and a plurality of centrifugally-operated contact-bodies also mounted on the rotary body and each coöperating with one of the signal devices to cause it to signal until another one of the devices signals.

11. In a speed-indicator, the combination with a rotary body, a plurality of contacts rotating with the rotary body, a plurality of centrifugally-operated contacts, each arranged so that it remains in electrical connection with one of the first-named contacts until a succeeding centrifugally-operated contact has made electrical connection with its contact.

12. In a speed-indicator, the combination with a rotary body, of contact means on the body, a plurality of centrifugally-operated contact-bodies, arranged on the axis of the rotary body and each remaining in electrical connection with one of the contact means until another enters into electrical connection with another of said means.

13. In a speed-indicator, the combination with a rotary body, of contact means on the body, a plurality of centrifugally-operated contact-bodies, arranged on the axis of the rotary body, a plurality of springs of different strength, acting on the centrifugally-operated contact-bodies to remain in electrical connection with one of the said contacts on the rotary body until another centrifugally-operated body enters into electrical connection with another of the said contacts.

In witness whereof I subscribe my signature in presence of two witnesses.

HANS. DAHL.

Witnesses:
HENRY HASPER,
WOLDEMAR HAUPT.